United States Patent [19]

Falk

[11] 4,080,804
[45] Mar. 28, 1978

[54] HIGH DEFLECTION CONSTANT SPEED UNIVERSAL JOINT

[76] Inventor: James B. Falk, 3 Lake James Ct., Florissant, Mo. 63034

[21] Appl. No.: 678,447

[22] Filed: Apr. 19, 1976

[51] Int. Cl.² ............................................... F16D 3/30
[52] U.S. Cl. ............................................. 64/21; 64/7; 64/8; 64/17 SP
[58] Field of Search ................. 64/21, 17, 18, 23, 6, 64/19

[56] References Cited

U.S. PATENT DOCUMENTS

| 2,864,246 | 12/1958 | Hulse | 64/21 |
| 3,396,553 | 8/1968 | Potter | 64/19 |
| 3,411,324 | 11/1968 | Federline | 64/21 |
| 3,903,711 | 9/1975 | Stage | 64/21 |
| 3,924,420 | 12/1975 | Falk | 64/21 |

Primary Examiner—Benjamin W. Wyche
Assistant Examiner—R. C. Turner
Attorney, Agent, or Firm—Rogers, Eilers & Howell

[57] ABSTRACT

A high deflection, constant speed, universal joint has two end members which can be mounted on the adjacent ends of angularly-displaced shafts, has a first torque-transmitting support which is pivoted to one of those end members and which is directed transversely of the axis of that end member and which can oscillate relative to that end member about a first axis, has a second torque-transmitting support which is pivoted to the other of those end members and which is directed transversely of the axis of that other end member and which can oscillate relative to that other end member about a second axis, has variable-length torque-transmitting linkages which are pivotally secured to the first support for oscillation about a third axis and which are pivotally secured to the second support for oscillation about a fourth axis, and has actual or virtual means to cause the axes of the shafts to intersect and to cause the intersection of those axes to be equidistant from the first and second axes.

15 Claims, 13 Drawing Figures

HIGH DEFLECTION CONSTANT SPEED UNIVERSAL JOINT

BACKGROUND OF THE INVENTION

The High Deflection Constant Speed Universal Joint of my U.S. Pat. No. 3,924,420 can be used to interconnect driving and driven shafts which have the axes thereof displaced by relatively-large angles. In addition, that universal joint will cause the driven shaft to move at the same speed as the driving shaft and to be free of acceleration and deceleration forces during each revolution thereof. However, that High Deflection Constant Speed Universal Joint cannot be used to interconnect driving and driven shafts which have the axes thereof displaced by angles as large as 90°. Further, that High Deflection Constant Speed Univeral Joint, and all other prior universal joints of which I am aware, have only three axes about which the torque transmitting components thereof can oscillate relative to each other.

SUMMARY OF THE INVENTION

The present invention provides a universal joint which can interconnect driving and driven shafts that have the axes thereof displaced by very large angles. One preferred embodiment of universal joint provided by the present invention can interconnect shafts which have the axes thereof displaced by angles as large as 120°, and other preferred embodiments of universal joint provided by the present invention can interconnect shafts which have the axes thereof displaced by angles as large as 100° when those embodiments are equipped with appropriate axes-interrelating means. All of those preferred embodiments of universal joint cause the driven shaft to move at the same speed as the driving shaft and to be free of acceleration and deceleration forces during each revolution thereof. It is, therefore, an object of the present invention to provide a constant speed universal joint which can inter-connect driving and driven shafts which have the axes thereof displaced by very large angles.

The universal joint provided by the present invention has two end members which can be mounted on the adjacent ends of angularly-displaced shafts, has a first torque-transmitting support which is pivoted to one of those end members and which is directed transversely of the axis of that end member and which can oscillate relative to that end member about a first axis, has a second torque-transmitting support which is pivoted to the other of those end members and which is directed transversely of the axis of that other end member and which can oscillate relative to that other end member about a second axis, has variable-length torque-transmitting links which are pivotally secured to the first support for oscillation about a third axis and which are pivotally secured to the second support for oscillation about a fourth axis, and has actual or virtual means to cause the axes of the shafts to intersect and to cause the intersection of those axes to be equidistant from the first and second axes. The actual means will be located in a space which is defined by those supports and by those links, and will always hold the axes of the shafts in intersecting relation — even when one of those axes is deflected from the other of those axes by a very large angle. It is, therefore, an object of the present invention to provide a universal joint that has two end members which can be mounted on the adjacent ends of angularly-displaced shafts, has a first torque-transmitting support which is pivoted to one of those end members and which is directed transversely of the axis of that end member and which can oscillate relative to that end member about a first axis, has a second torque-transmitting support which is pivoted to the other of those end members and which is directed transversely of the axis of that other end member and which can oscillate relative to that other end member about a second axis, has variable-length torque-transmitting links which are pivotally secured to the first support for oscillation about a third axis and which are pivotally secured to the second support for oscillation about a fouth axis, and has actual or virtual means to cause the axes of the shafts to intersect and to cause the intersection of those axes to be equidistant from the first and second axes.

Each of the transversely-directed, torque-transmitting supports of at least one preferred embodiment of universal joint provided by the present invention has the form of an open frame which has side walls, end walls and auxiliary walls. Pivots secure the side walls of the transversely-directed, torque-transmitting supports to the two end members of the universal joint to define the first two axes, and the end walls and auxiliary walls of those supports bear pivots which define the third and fourth axes and which pivotally secure the variable-length, torque-transmitting links to those supports. Those variable-length, torque-transmitting links define the limits of the angles through which the axis of one of the end members of that preferred embodiment of universal joint can be deflected from the axis of the other of those end members. In one preferred embodiment of universal joint provided by the present invention, the lengths of the variable-length, torque-transmitting links permit the axis of one of the end members to be displaced as much as one hundred degrees, from the axis of the other of those end members; and in another preferred embodiment of universal joint, provided by the present invention, the lengths of the variable-length, torque-transmitting links permit the axis of one of the end members to be displaced as much as 120° from the axis of the other of those end members. It is, therefore an object of the present invention to provide a universal joint which has transversely-directed, torque-transmitting supports in the form of open frames that have side walls, end walls and auxiliary walls, which has pivots that secure the side walls of the transversely-directed, torque-transmitting supports to the two end members of the universal joint to define the first two axes, and which has pivots that are supported by those end walls and auxiliary walls and that rotatably support variable-length, torque-transmitting links whose lengths limit the angle of deflection between the axes of the shafts.

Each of the variable-length, torque-transmitting links of some of the universal joints provided by the present invention has a cylinder-like member and a piston-like member which are relatively movable. The relatively-movable members of each variable-length, torque-transmitting link are formed so they can reciprocate freely relative to each other but are held against circumferential rotation relative to each other. As a result, those variable-length, torque-transmitting links help hold the transversely-directed, torque-transmitting supports of the universal joint against rotation circumferentially relative to the axes of the end members. It is, therefore, an object of the present invention to provide a universal joint with variable-length, torque-transmitting links that have relatively movable components which are held against circumferential rotation relative to each other to help prevent circumferential rotation of the transversely-directed, torque-transmitting supports relative to the end members of that universal joint.

Other and further objects and advantages of the present invention should become apparent from an examination of the drawing and accompanying description.

In the drawing and accompanying description several preferred embodiments of the present invention are shown and described but it is to be understood that the drawing and accompanying description are for the purpose of illustration and do not limit the invention and that the invention will be defined by the appended claims.

DETAILED DESCRIPTION OF PREFERRED EMBODIMENT OF FIGS. 1-6

Figures 1, 2, 3, 4, 5, 6, 13:
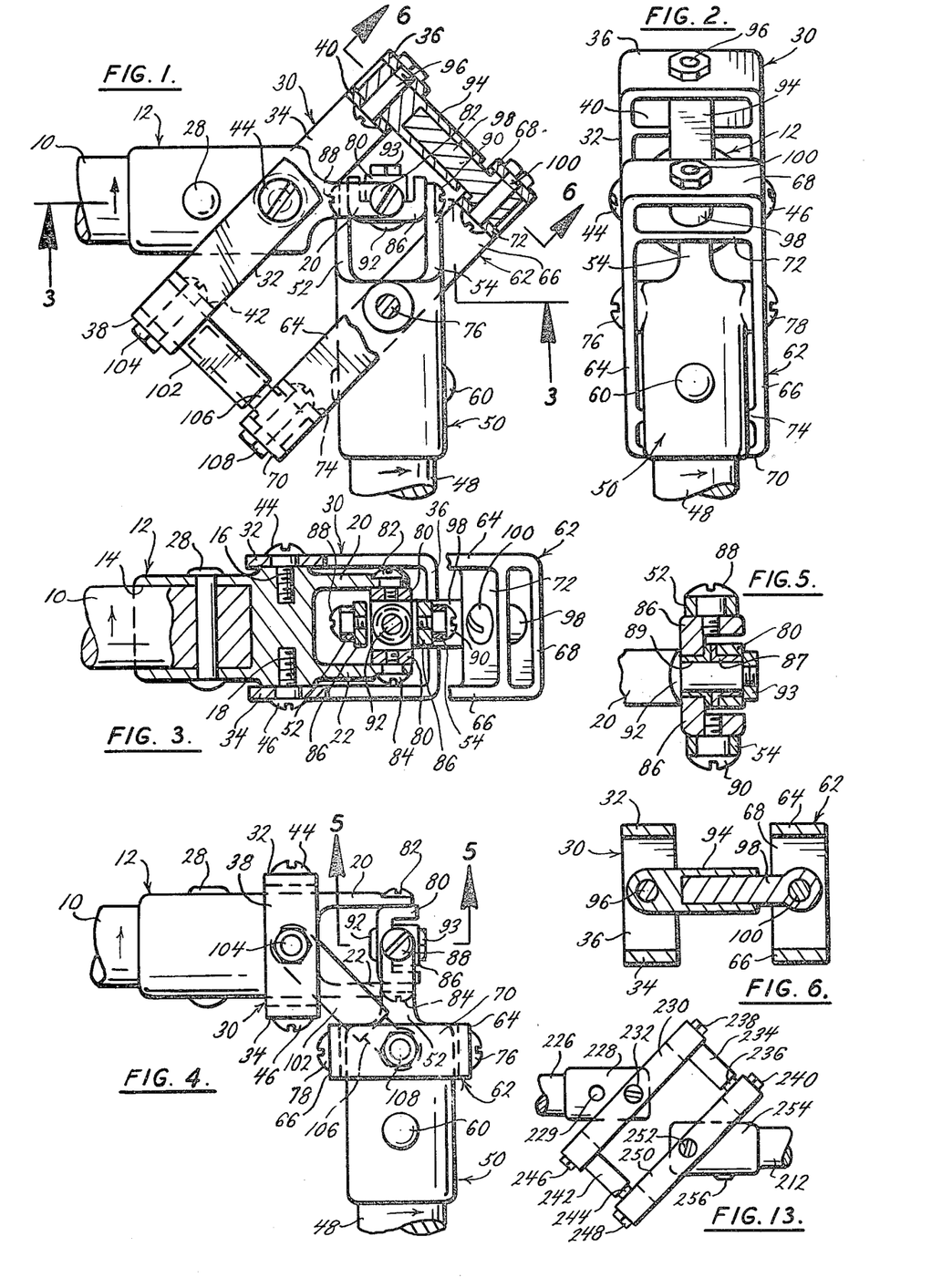
FIG. 1 is a partially sectioned, partially broken-away plan view of one preferred embodiment of universal joint provided by the present invention.
FIG. 2 is an elevational view of the right-hand end of the universal joint shown in FIG. 1.
FIG. 3 is a sectional view through the universal joint of FIG. 1, and it is taken along the broken plane indicated by the broken line 3—3 in FIG. 1.
FIG. 4 is a plan view of the universal joint of FIG. 1 after the driving shaft has been rotated 90°.
FIG. 5 is a sectional view, on a larger scale, through the universal joint of FIG. 1, and it is taken along the plane indicated by the line 5—5 in FIG. 4.
FIG. 6 is a sectional view, on the scale of FIG. 1, through the universal joint of FIG. 1, and it is taken along the plane indicated by the line 6—6 in FIG. 1.
FIG. 12 is a partially-sectioned plan view of the universal joint shown in FIG. 11 after the driving shaft has been rotated 90° and FIG. 13 is a diagrammatic view showing how the universal joint of FIGS. 9 and 10 can be used to interconnect two shafts that have the axes thereof parallel to, but displaced from, each other.

Referring particularly to FIGS. 1-6, the numeral 10 denotes a shaft which has the axis thereof displaced from the axis of a shaft 48 by 90°. The shaft 10 can be a driving shaft and the shaft 48 can be a driven shaft, or vice versa. The numeral 12 generally denotes one end element of one preferred embodiment of universal joint provided by the present invention; and that end element has a cylindrical socket 14 therein, as shown particularly by FIG. 3. Threaded sockets 16 and 18 extend inwardly from opposite sides of the end element 12, as shown by FIG. 3; and the axes of those sockets define a first axis of oscillation which is normal to the axis of socket 14. Projections 20 and 22 extend from the right-end of end member 12, and those projections are parallel to the axia of socket 14.

A sleeve bearing, not shown, will be mounted within an opening in projection 20, and a sleeve bearing, not shown, will be mounted within an opening in projection 22. Those sleeve bearings will be coaxial; and the axes thereof will be normal to the axis of shaft 10. Anti-friction bearings can be used in lieu of those sleeve bearings where the size of the end element 12 permits. A rivet 28 extends through aligned openings in end element 12 and in shaft 10 to fixedly secure that end element to that shaft.

The numeral 30 generally denotes a transversely-directed, torque-transmitting support which has side walls 32 and 34, end walls 36 and 38, and auxiliary walls 40 and 42. Those side walls and end walls coact to give support 30 the form of an open frame; and those auxiliary walls are parallel to those end walls but are spaced short distances inwardly from those end walls. A pivot 44, in the form of a shouldered screw, extends through an opening in the side wall 32 to seat in the threaded socket 16; and a sleeve bearing, not shown, will be mounted within that opening. A pivot 46, in the form of a shouldered screw, extends through an opening in the side wall 34 to seat in the threaded socket 18; and a sleeve bearing, not shown, will be mounted within that opening. Anti-friction bearings can be used in lieu of those sleeve bearings where the size of the end element 12 permits. The screws 44 and 46 serve as low-friction pivots for support 30. The auxiliary walls 40 and 42 are spaced far enough apart to keep those auxiliary walls from engaging other parts of the universal joint as support 30 oscillates about the axis defined by the pivots 44 and 46.

The numeral 50 generally denotes an end element which preferably is identical to the end element 12; and it has a cylindrical socket, not shown, which telescopes over the end of shaft 48. That end element has threaded sockets, not shown, which are comparable to the threaded sockets 16 and 18 and which accommodate pivots 76 and 78. The numerals 52 and 54 denote projections which extend upwardly from the upper end of end member 50 in FIGS. 1-4, and those projections are parallel to the axis of shaft 48. A sleeve bearing, not shown will be mounted within an opening in projection 52, and a sleeve bearing, not shown, will be mounted within an opening in projection 54. Those sleeve bearings will be coaxial; and the axes thereof will be normal to the axis of shaft 48. Anti-friction bearings can be substituted for those sleeve bearings where the size of end element 50 permits. A rivet 60 extends throught aligned openings in end member 50 and in shaft 48 to fixedly secure that end member to that shaft.

The numeral 62 generally denotes a transversely-directed, torque-transmitting support which has side walls 64 and 66, end walls 68 and 70, and auxiliary walls 72 and 74. That support preferably is identical to the support 30, and hence has the form of an open frame. The pivot 76, which has the form of a shouldered screw, extends through an opening in the side wall 64 that has a sleeve bearing, not shown, therein; and the pivot 78, which has the form of a shouldered screw, extends through an opening in the side wall 66 that has a sleeve bearing, not shown, therein. The threaded shanks of those pivots will seat in the sockets, not shown, therefor in the end member 50. Anti-friction bearings can be used in lieu of those sleeve bearings where the size of the end element 12 permits. The pivots 76 and 78 serve as low-friction pivots for the support 62. The auxiliary walls 72 and 74 are spaced far enough apart to keep all parts of those auxiliary walls from engaging other parts of the universal joint as support 62 oscillates about the axis defined by the pivots 44 and 46. That axis is the second axis of oscillation of the universal joint of FIGS. 1–4.

The numeral 80 denotes a U-shaped member which has the sides thereof disposed between, and immediately adjacent, the inner faces of projections 20 and 22, as shown by FIGS. 3 and 4. Threaded openings in those sides are coaxial with the sleeve bearings, not shown, in projections 20 and 22; and pivots 82 and 84, in the form of shouldered screws, extend inwardly through those sleeve bearing to seat in those threaded openings. Anti-friction bearings, not shown, can be used in the projections 20 and 22 where the size of those projections permits. The pivots 82 and 84 permit ready rotation of U-shaped member 80 relative to end member 12. The numeral 86 denotes a U-shaped member which preferably is identical to the U-shaped member 80. The sides of U-shaped member 86 are disposed between, and immediately adjacent, the inner faces of projections 52 and 54, as shown by FIGS. 1, 3 and 5. Threaded openings in those sides are coaxial with the sleeve bearings, not shown, in projections 52 and 54; and pivots 88 and 90, in the form of shouldered screws, extend inwardly through those sleeve bearings to seat in those threaded openings. Anti-friction bearings, not shown, can be used in the projections 52 and 54 where the size of those projections permits. The pivots 88 and 90 permit ready rotation of U-shaped member 86 relative to end member 50. The numeral 92 denotes a shouldered screw which extends through aligned sleeve bearings 87 and 89 which are mounted in centered openings in the bases of U-shaped members 80 and 86; and a nut 93 is threaded on the end of that screw. Anti-friction bearings can be used in lieu of those sleeve bearings where the size of the U-shaped members 80 and 86 permits. The screw 92 permits ready rotation of those U-shaped members relative to each other. The projections 20, 22, 52 and 54, the U-shaped members 80 and 86, and the screws 82, 84, 88, 90 and 92 coact to constitute an axes-interrelating means which will always hold the axes of end members 12 and 50 in intersecting relation. Moreover, because the distance from the axes of screws 82 and 84 to the axes defined by the screws 44 and 46 is equal to the distance from the axes of screws 88 and 90 to the axes defined by the screws 76 and 78, the projections 20, 22, 52 and 54, the U-shaped members 80 and 86, which are held in rotatable relation by screw 92, and the screws 82, 84, 88 and 90 coact to constitute a centering means.

The numeral 94 denotes a cylinder-like, torque-transmitting member which has one end thereof rotatably secured to support 30 by a pivot 96. A sleeve bearing, not shown, will be disposed within the cylinder-like, torque-transmitting member 94 to accommodate the pivot 96; and, where the size of that cylinder-like, torque-transmitting member permits, an anti-friction bearing can be substituted for that sleeve bearing. The pivot 96 includes a bolt and a nut; and it is held within aligned openings in end wall 36 and auxiliary wall 40 of support 30. The numeral 98 denotes a piston-like, torque-transmitting member which has one end thereof telescoped within member 94 and which has the other end thereof rotatably secured to support 62 by a pivot 100. A sleeve bearing, not shown, will be disposed within the piston-like, torque-transmitting member 98 to accommodate the pivot 100; and, where the size of that piston-like, torque-transmitting member permits, an anti-friction bearing can be substituted for that sleeve bearing. The pivot 100 includes a bolt and a nut; and it is held within aligned openings in end wall 68 and auxiliary wall 72 of support 62. The numeral 102 denotes a cylinder-like, torque-transmitting member which has one end thereof rotatable secured to support 30 by a pivot 104. A sleeve bearing, not shown, will be disposed within the cylinder-like, torque-transmitting member 102 to accommodate the pivot 104; and, where the size of that cylinder-like, torque-transmitting member permits, an anti-friction bearing can be substituted for that sleeve bearing. The pivot 104 includes a nut and bolt; and it is held within aligned openings in end wall 38 and auxiliary wall 42 of support 30. The numeral 106 denotes a piston-like, torque-transmitting member which has one end thereof telescoped within member 102 and which has the other end thereof rotatably secured to support 62 by a pivot 108. A sleeve bearing, not shown, will be disposed within the piston-like, torque-transmitting member 106 to accommodate the pivot 108; and, where the size of that piston-like, torque-transmitting member permits, an anti-friction bearing can be substituted for that sleeve bearing. The pivot 108 includes a nut and a bolt; and it is held within aligned openings in end wall 70 and auxiliary wall 74 of that support. The piston-like, torque transmitting members 98 and 106 are square in cross section; and the interiors of the cylinder-like, torque-transmitting members 94 and 102 are complementary to those cross sections. As a result, circumferential rotation of those cylinder-like, torque-transmitting members relative to those piston-like, torque-transmitting members is positively prevented. Consequently, the torque-transmitting members 94 and 98 constitute a variable-length, torque-transmitting link and, similarly, the torque-transmitting members 102 and 106 constitute a variable-length, torque-transmitting link. Although square cross sections are very useful for the piston-like, torque-transmitting members 98 and 106 and for the interiors of the cylinder-like, torque-transmitting members 94 and 102, other non-rotative cross sections and interiors could be used. For example, other polygonal cross sections and interiors, splined cross sections and interiors, and key and keyway cross sections and interiors could be used.

The pivots 96 and 104 define an axis which is the third oscillation axis of the univeral joint of FIGS. 1–6; and that axis is normal to, and passes through, the axes of pivots 44 and 46, and also through the axis of shaft 10. The pivots 100 and 108 define an axis which is the fourth oscillation axis of the universal joint of FIGS. 1–6; and that axis is normal to, and passes through, the axes of pivots 76 and 78, and also through the axis of shaft 48. As a result, the universal joint of FIGS. 1–6 has four oscillation axes—irrespective of the oscillation axes of the axes-interrelating and centering means of that universal joint.

Whenever the shafts 10 and 48 are coaxial, the right-hand elongated edges of the side walls 32 and 34 of support 30 will define a plane which is perpendicular to the axis that is defined by those shafts; and, similarly, the left-hand elongated edges of the side walls 64 and 66 of support 62 will define a plane which is perpendicular to that axis. Further, the axes of the variable-length, torque-transmitting links which are defined by the torque-transmitting members 94 and 98 and 102 and 106 will be parallel to the axis defined by those shafts. This is the zero deflection position of the universal joint shown by FIGS. 1-6.

Whenever the axis of shaft 48 is dislaced from the axis of shaft 10, the angle of deflection is the number of degrees through which the axis of shaft 48 has been moved away from the axis of shaft 10. As shown by FIGS. 1 and 4, the universal joint of FIGs. 1-6 can transmit power throughout a range of deflection angles from 0° through 90°; because the axis of shaft 48 has been deflected 90° from the axis of shaft 10. However, that universal joint can transmit power through a range of deflection angles up to 100°.

Rotation of shaft 10 in the direction shown by the arrows in FIGS. 1-4 will cause concomitant rotation of the end member 12; and the pivots 44 and 46 will cause the support 30 to rotate with that end member 12 while permitting that support to oscillate about the axis defined by those pivots. During the first 90° of each revolution of the shaft 10 in the indicated direction, the support 30 will, when viewed along the 44-46 axis from the position of pivot 44, rotate in the counterclockwise direction about that axis to the position of FIG. 4 wherein it is normal to the axis of the end member 12. During the second 90° of rotation of that shaft, the support 30 will, when viewed along the 44-46 axis from the position of pivot 44, continue to rotate in the counter-clockwise direction about that axis until it reaches a position wherein the pivot 104 occupies the position occupied by pivot 96 in FIG. 1 and the pivot 96 occupies the position occupied by pivot 104 in FIG. 1. This means that while the support 30 is rotating 180° circumferentially with the end member 12, it is rotating in the counterclockwise direction about the 44-46 axis an angular distance equal to the deflection angle between the axes of the shafts 10 and 48. During the third 90° of each revolution of the shaft 10, the support 30 will, when viewed along the 44-46 axis from the position of pivot 44, rotate in the clockwise direction about that axis to a position wherein it is normal to the axis of the end member 12. During the fourth 90° of rotation of that shaft, the support 30 will, when viewed along the 44-46 axis, from the position of pivot 44, continue to rotate in the clockwise direction until it again reaches the position shown by FIG. 1. This means that while the support 30 is rotating 180° circumferentially with the end member 12, it is, when viewed along the 44-46 axis from the position of pivot 44, rotating in the clockwise direction about the axis defined by the pivots 44 and 46 an angular distance equal to the deflection angle between the axes of the shafts 10 and 48.

The pivots 96 and 104 respond to rotation and oscillation of the support 30 to force the cylinder-like, torque-transmitting members 94 and 102 to rotate and oscillate; and those cylinder-like, torque-transmitting members force the piston-like, torque-transmitting members 98 and 106 to rotate and oscillate. The pivots 100 and 108 respond to rotation and oscillation of those piston-like, torque-transmitting members to force the support 62 to rotate and oscillate; and thereby force the support 62 to rotate as the support 30 is being rotated. further, the pivots 76 and 78 force the end member 50 to rotate as the support 62 is rotated; and hence the rotation of the end member 12 causes rotation of the end member 50.

The right-hand elongated edges of the side walls 32 and 34 of support 30 define a plane which, in FIG. 1, is normal to the plane of the paper but which is inclined to the axis of shaft 10. During the first 90° of each revolution of the shaft 10 in the indicated direction, the portion of the right-hand elongated edge of the side wall 32 which is adjacent the end wall 36 will move inwardly of the plane of the paper while also rotating in the counterclockwise direction when viewed along the 44-46 axis from the position of pivot 44. Simultaneously, the portion of that elongated edge which is adjacent the end wall 38 will move outwardly of the plane of the paper while also rotating in the counterclockwise direction when viewed along the 44-46 axis from the position of pivot 44. At the end of the first 90° of rotation, the right-hand elongated edges of the side walls 32 and 34 will define a further plane which is normal to the plane of the paper and which also is normal to the axis of shaft 10, as shown by FIG. 4. During the second 90° of rotation of shaft 10, the portion of the right-hand elongated edge of the side wall 32 which is adjacent the end wall 36 will move outwardly into the plane of the paper while continuing to rotate in the counterclockwise direction when viewed along the 44-46 axes from the position of pivot 44. Simultaneously, the portion of that elongated edge which is adjacent the end wall 38 will move inwardly into the plane of the paper while continuing to rotate in the counterclockwise direction when viewed along the 44-46 axis from the position of pivot 44. At the end of the second 90° of rotation, the right-hand elongated edges of the side walls 32 and 34 will define the plane indicated by FIG. 1; but the side wall 34 will be exposed and the side wall 32 will be concealed.

During the rotation of shaft 10 through its third quadrant of rotation, in the indicated direction, the portion of the right-hand elongated edge of side wall 32 which is adjacent the end wall 36 will move outwardly of the plane of the paper while rotating in the clockwise direction when viewed along the 44-46 axis from the position of pivot 44. Simultaneously, the portion of that elongated edge which is adjacent the end wall 38 will move inwardly of the plane of the paper while rotating in the clockwise direction when viewed along the 44-46 axis from the position of pivot 44. At the end of the third 90° of rotation, the right-hand elongated edges of the side walls 32 and 34 will define the plane indicated by FIG. 4; but the side wall 32 will be in the position previously occupied by the side wall 34, and vice versa. During the fourth quadrant of rotation of shaft 10, the portion of the right-hand elongated edge of side wall 32 which is adjacent the end wall 36 will move inwardly into the plane of the paper while continuing to rotate in the clockwise direction when viewed along the 44-46 pivot from the position of pivot 44. Simultaneously, the portion of that elongated edge which is adjacent the end wall 38 will move outwardly into the plane of the paper while continuing to rotate in the clockwise direction when viewed along the 44-46 axis from the position of pivot 44. At the end of the fourth 90° of rotation, the side walls 32 and 34 will again be in the positions shown by FIG. 1. During the rotation of the shaft 10 through the four quadrants of its revolution, the pivot 96 will follow a circular path in a plane which is normal to the plane of the paper but which is displaced from the axis of shaft 10 by the angle defined by the 96-104 axis. The pivot 104 will follow that same circular path.

As that portion of the right-hand elongated edge of side wall 32 of the support 30 which is adjacent the end wall 36 moves inwardly of the plane of the paper and rotates in the counterclockwise when viewed along the 44-46 axis from the position of pivot 44, during the first quadrant of rotation of the shaft 10, that portion of the left-hand elongated edge of side wall 64 of support 62 which is adjacent the end wall 68 also will move inwardly of the plane of the paper but will rotate in the clockwise direction when viewed along the 76–78 axis from the position of pivot 76. Simultaneously, that portion of the left-hand elongated edge of that side wall which is adjacent the end wall 70 will move outwardly of the plane of the paper while rotating in the clockwise direction when viewed along the 76–78 axis from the position of pivot 76. At the end of the first 90° of rotation of shaft 10, the support 62 will be in the position shown by FIG. 4. During the second quadrant of rotation of shaft 10, the portion of the left-hand elongated edge of side wall 64 which is adjacent the end wall 68 will move outwardly into the plane of the paper while continuing to rotate in the clockwise direction when viewed along the 76–78 axis from the position of pivot 76. Simultaneously, the portion of the left-hand elongated edge of that side wall which is adjacent the end wall 70 will move inwardly into the plane of the paper while continuing to rotate in the clockwise direction when viewed along the 76–78 axis from the position of pivot 76. At the end of the second 90° of rotation of shaft 10, the support 62 will define the plane indicated by FIG. 1; but side wall 66 will be exposed and side wall 64 will be concealed. During the third quadrant of rotation of shaft 16, that portion of the left-hand elongated edge of side wall 66 which is adjacent end wall 68 will move outwardly of the plane of the paper while also rotating in the counterclockwise direction when viewed along the 76–78 axis from the position of pivot 76. Simultaneously, that portion of the left-hand elongated edge of that side wall which is adjacent the end wall 70 will move inwardly of the plane of the paper while rotating in the counterclockwise direction when viewed along the 76–78 axis from the position of pivot 76. At the end of the third 90° of rotation of shaft 10, the support 62 will define the plane indicated by FIG. 4; but the side wall 64 will be in the position previously occupied by the side wall 66, and vice versa. During the fourth quadrant of rotation of shaft 10, that portion of the left-hand elongated edge of side wall 66 which is adjacent end wall 68 will move inwardly into the plane of the paper while continuing to rotate in the counterclockwise direction when viewed along the 76–78 axis from the position of pivot 76. Simultaneously, that portion of the left-hand elongated edge of that side wall which is adjacent the end wall 70 will move outwardly of the plane of the paper while rotating in the counterclockwise direction when viewed along the 76–78 axis from the position of pivot 76. At the end of the fourth 90° of rotation of shaft 10, the support 62 will again be in the position shown by FIG. 1. During the rotation of the shaft 10 through the four quadrants of its revolution, the pivot 100 will follow a circular path in a plane which is normal to the plane of the paper but which is displaced from the axes of shaft 48 by the angle defined by the 100–108 axis. The pivot 108 will follow that same circular path. It should be noted that the plane in which pivots 96 and 104 follow a circular path and the plane in which pivots 100 and 108 follow a circular path are parallel to each other; and hence whenever the deflection angle of the universal joint in FIGS. 1–6 is fixedly held, the length-accommodating capability of the cylinder-like and piston-like elements 94, 96 and 102, 106 is not used.

In moving from the position shown in FIG. 1 to the position shown by FIG. 4, the support 30 rotates about the first oscillation axis which is defined by the pivots 44 and 46, and also rotates circumferentially with the end element 12. The rotation of that support about that oscillation axis will be through an angle which is one-half of the angle of deflection between the shafts 10 and 48; but the circumferential rotation of that support with that end element will be through an angle of 90°. Similarly, in rotating from the position shown by FIG. 1 to the position shown by FIG. 4, the support 62 rotates about the second oscillation axis which is defined by the pivots 76 and 78, and also rotates circumferentially with the end element 50. The rotation of that support about that oscillation axis will be through an angle which is one-half of the angle of deflection between the shafts 10 and 48; but the circumferential rotation of that support with that end element 50 will be through an angle of 90°.

During the second 90° of rotation of the shaft 10, each of the supports 30 and 62 will rotate 90° circumferentially with the end member to which it is pivotally secured. Also, each of those supports will rotate through an angle, equal to one-half of the angle of deflection between the shafts 10 and 48, as it rotates about the axis of the pivots which secure it to its end member.

All of this means that during each revolution of shaft 10, each support 30 and 62 will rotate from an initial position through an angular extent equal to one-half of the angle of deflection between shaft 10 and 48 to a second position wherein it is normal to the axis of the end member to which it is pivoted, through an equal angular extent to a third position which is similar to the initial position but wherein the side walls 32 and 64 occupy the initial positions of the side walls 34 and 66, back through an equal angular extent to a fourth position wherein it is normal to the axis of the end member to which it is pivoted but wherein the side walls 32 and 64 occupy the positions which the side walls 34 and 66 occupied in the second position, and then back through a further equal angular extent to the initial position. Further, it means that during each revolution of shaft 10, each support 30 and 62 will rotate circumferentially with its end element through an angle of three hundred and sixty degrees.

If the shaft 10 is considered to be the driving shaft, the end element 12 will act through the pivots 44 and 46 to transmit torque to the support 30, the pivots 96 and 104 will transmit torque from that support to the variable-length, torque-transmitting links constituted by the torque-transmitting members 94, 98, 102 and 106, the pivots 100 and 108 will transmit torque from those variable-length, torque-transmitting links to the support 62, and the pivots 76 and 78 will transmit torque from that support to the end element 50. If the shaft 48 is considered to be the driving shaft, torque would be transmitted to the shaft 10 by end element 50, pivots 76 and 78, support 62, pivots 100 and 108, torque-transmitting members 94, 98, 102 and 106, pivots 96 and 104, support 30, pivots 44 and 46, and end element 12.

As the shaft 10 rotates, the projections 20 and 22 on the right-hand end of end member 12 also will rotate. Consequently, the pivots 82 and 84 will force the U-shaped member 80 to rotate with that end member. As the end member 50 is rotated by the end member 12, the pivots 44 and 46, the support 30, the pivots 96 and 104, the torque-transmitting members 94, 98, 102 and 106, the support 62, and the pivots 76 and 78, the projections 52 and 54 at the upper end of the end member 50 also will rotate. Consequently, the pivots 88 and 90 will force the U-shaped member 86 to rotate with that end member. The pivot 92, which interconnects the U-shaped members 80 and 86, will permit relative rotary movement of those members; but it will hold those members in assembled relation. Further, that pivot will coact with U-shaped members 80 and 86, pivots 82, 84, 88 and 90, and projections 20, 22, 52 and 54 to hold the axes of the shafts 10 and 48 so they will always intersect at a point which is midway between the axis defined by the pivots 44 and 46 and the axis defined by the pivots 76 and 78. However, the pivots 82, 84, 88, 90 and 92 are not intended to transmit torque from shaft 10 to shaft 48 or vice versa. Consequently, the projections 20, 22, 52 and 54, the U-shaped members 80 and 86, and the pivots 82, 84, 88, 90 and 92 constitute an axes-interrelating and centering means rather than a torque-transmitting means.

The oscillation axis defined by the pivots 96 and 104 intersects the axis of shaft 10. Similarly, the oscillation axis defined by the pivots 100 and 108 intersects the axis of shaft 48. Further, the oscillation axis defined by the pivots 96 and 104 intersects the oscillation axis defined by the pivots 44 and 46 at 90°; and the oscillation axis defined by the pivots 100 and 108 intersects the oscillation axis defined by the pivots 76 and 78 at 90°. The pivots 82 and 84 define an oscillation axis of shaft interrelating and centering means that is parallel to the oscillation axis defined by the pivots 44 and 46; but those oscillation axes could be shifted circumferentially relative to each other about the axis of shaft 10. Similarly, the pivots 88 and 90 define an oscillation axis of that centering means which is parallel to the oscillation axis defined by the pivots 76 and 78; but those oscillation axes could be shifted circumferentially relative to each other about the axis of shaft 48. However, the oscillation axis defined by the pivots 82 and 84 must always intersect the oscillation axis defined by the pivots 88 and 90; and those oscillation axes will be perpendicular to each other in the zero deflection position of shafts 10 and 48.

The cylinder-like torque-transmitting members 94 and 102 will oscillate about the axis defined by the pivots 96 and 104 during each revolution of the shaft 10. Also, the piston-like, torque-transmitting members 98 and 106 will oscillate about the axis defined by the pivots 100 and 108 during each such revolution. FIGS. 2 and 4 show, respectively, the mid-point and one end limit of the range of oscillation of those torque-transmitting members when the angle of deflection between shafts 10 and 48 is 90°. That range of oscillation will decrease as the angle of deflection between shafts 10 and 48 is decreased; and, at zero deflection angle, there will be no oscillation of the torque-transmitting members 94 and 102 and 98 and 106 about the oscillation axes defined by pivots 96 and 104 and 100 and 108, respectively.

It will be noted that in the initial position shown by FIGS. 1–3, the axes of the supports 30 and 62 are parallel to, and are disposed at opposite sides of, the bisector of the supplement of the angle of deflection of the universal joint. That same relationship will exist in each corresponding initial position of the universal joint, irrespective of the angle of deflection of the universal joint. It also will be noted that the universal joint of FIGS. 1–6 does not require additional structure to cause universal joint of FIGS. 1–6 to parallel the bisector of the supplement of the angle of deflection of the universal joint in each corresponding initial position of that universal joint. As a result, the universal joint of FIGS. 1–6 can be made more compact and with fewer parts than can prior constant speed universal joints of comparable torque-transmitting capability.

Figures 7, 8, 9, 10, 11, 12:
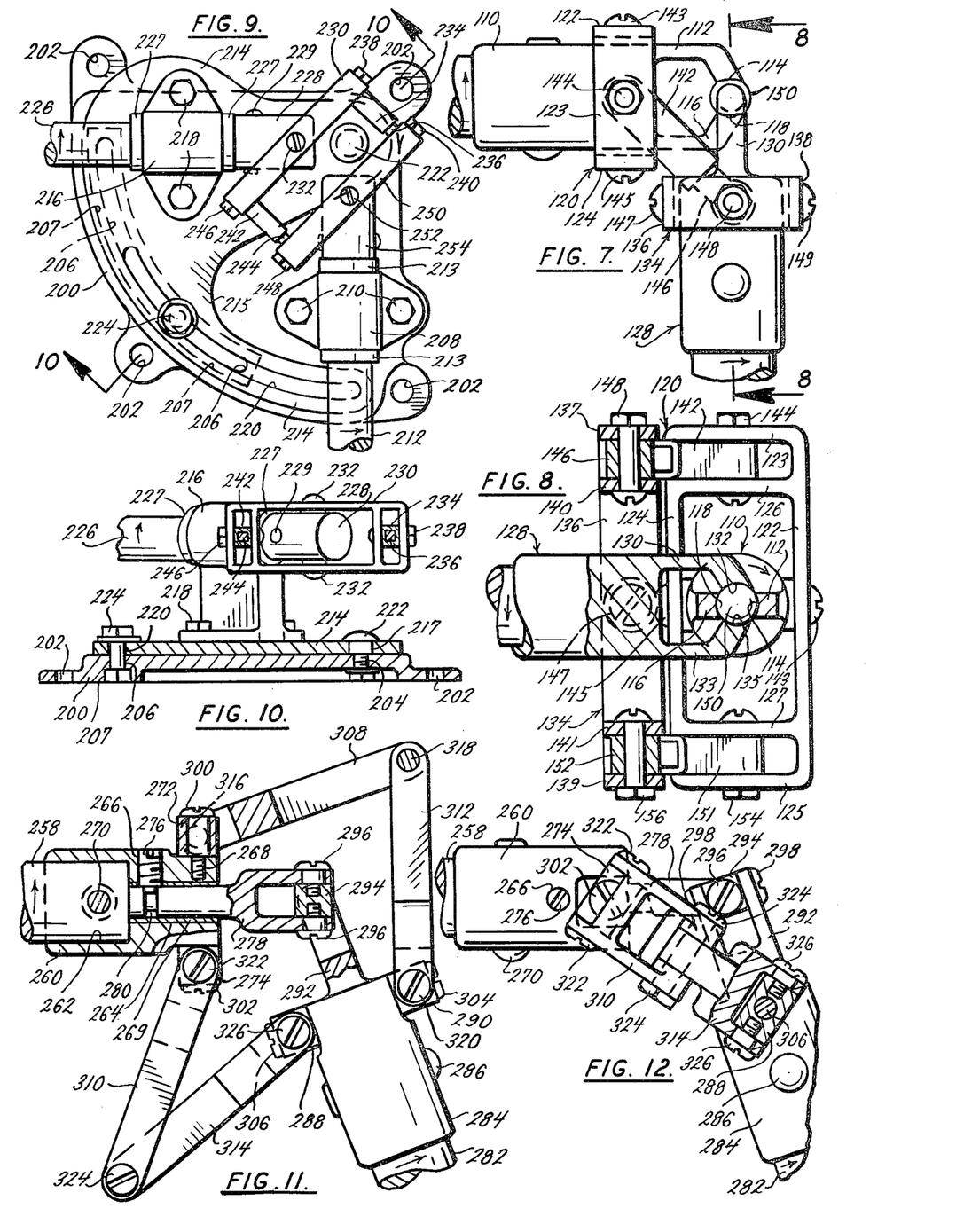
FIG. 7 is a plan view of a second preferred embodiment of universal joint provided by the present invention.
FIG. 8 is a sectional view through the universal joint of FIG. 7, and it is taken along the plane indicated by the line 8—8 in FIG. 7.
FIG. 9 is a plan view of a third preferred embodiment of universal joint provided by the present invention.
FIG. 10 is a sectional view through the universal joint of FIG. 9, and it is taken along the plane indicated by the line 10—10 in FIG. 9.
FIG. 11 is a partially sectioned, partially broken-away plan view of a fourth preferred embodiment of universal joint provided by the present invention.

DETAILED DESCRIPTION OF PREFERRED EMBODIMENT OF FIGS. 7 and 8

Referring particularly to FIG. 7, the numeral 110 generally denotes an end member which differs from end member 12 in having projections 112 and 116 with inwardly-directed arms that define sockets 114 and 118 which are spherically concave. The numeral 120 generally denotes a transversely-directed, torque-transmitting support which has side walls 122 and 124, end walls 123 and 125, and auxiliary walls 126 and 127. Preferably, the support 120 is identical to support 30.

The numeral 128 in FIG. 7 generally denotes an end member which differs from end member 50 in having a projection 130 with an inwardly-directed arm that defines a spherically concave socket 132 and in having a projection 133, which is shown in FIG. 8, with an inwardly-directed arm that defines a spherically concave socket 135. The numeral 134 generally denotes a transversely-directed, torque-transmitting support which has side walls 136 and 138, end walls 137 and 139, and auxiliary walls 140 and 141. The support 134 preferably is identical to the support 62.

The support 120 is pivotally secured to the end member 110 by pivots 143 and 145 which preferably are identical to the pivots 44 and 46. Similarly, the support 134 is pivotally secured to the end element 128 by pivots 147 and 149 which preferably are identical to the pivots 76 and 78.

The numeral 142 denotes a cylinder-like, torque-transmitting member which preferably is identical to the cylinder-like torque-transmitting member 102; and a pivot 144 rotatably secures that cylinder-like, torque-transmitting member to the support 120. The numeral 146 denotes a piston-like, torque-transmitting member which preferably is identical to the piston-like, torque-transmitting member 106; and a pivot 148 rotatably secures that pivot-like, torque-transmitting member to the support 134. A further cylinder-like, torque-transmitting member 151 and a further piston-like, torque-transmitting member 152 are rotatably secured to the supports 120 and 134 by pivots 154 and 156, respectively.

A ball 150 is disposed within the space which is defined by the spherically-concave sockets 114, 118, 132 and 135. Those sockets will initially be spaced apart a distance which is great enough to enable the ball 150 to be set in position; but thereafter those sockets will be pressed close enough together to permanently confine and hold that ball without creating undue frictional forces between themselves and that ball.

FIGS. 7 and 8 show a universal joint which differs primarily from the universal joint of FIGS. 1–6 in having a different axes-interrelating and centering means. The axes-interrelating and centering means of FIGS. 7 and 8 and the axes-interrelating and centering means of FIGS. 1–6 can perform their functions throughout similar ranges of angular deflections. As a result, the universal joint of FIGS. 7 and 8 can be used to transmit power from one shaft to another even where the angle of deflection between those shafts exceeds 90° but does not exceed 100°. The torque-transmitting functions of the parts of the universal joint shown in FIGS. 7 and 8 are comparable to the torque-transmitting functions of the parts of the universal joint shown in FIGS. 1–6; and hence a detailed description of the universal joint of FIGS. 7 and 8 is believed to be unnecessary.

DETAILED DESCRIPTION OF PREFERRED EMBODIMENT OF FIGS. 9 AND 10

Referring particularly to FIGS. 9 and 10, the numeral 200 denotes a mounting base which is quadrant-like in plan view. Four holes 202 are provided in that mounting base to accommodate fasteners which can be seated within a suitable support to fixedly secure that base to that support. The numeral 204 denotes a hole in the base 200 which is spaced inwardly from the opening 202 at the apex that is defined by the base 200. That hole has the axis thereof normal to the plane defined by that base and located so it intersects the intersection of the axes of shafts 212 and 226. The numeral 206 denotes an arcuate slot in the base 200 adjacent the arcuate edge of that base; and that slot and hole 204 are concentric. The numeral 207 denotes the greater-width lower portion of that arcuate slot. The numeral 208 denotes a bearing block which is disposed adjacent the right-hand edge of the base 200 and which is secured to that base by hexagonal-headed screws 210.

The shaft 212 is journaled within the bearing, not shown, that is held by the bearing block 208. Collars 213 are telescoped over the shaft 212; and those collars are held immediately adjacent the opposite ends of the bearing, not shown, within the bearing block 208 by set screws, not shown. Those collars fix the axial position of shaft 212 relative to the bearing mounting 208 while permitting ready rotation of that shaft relative to that bearing mounting.

The numeral 214 denotes a movable base which is generally quadrant-like in plan view. However, that base has a deep notch 215 in the right-hand edge thereof to accommodate the bearing mounting 208. A bearing mounting 216 is located adjacent that edge of the base 214 which is remote from the notch 215; and hexagonal-headed screws 218 secure that bearing block to that base. An opening 217 is provided in the base 214 adjacent the apex which is defined by that base. That opening is coaxial with, but has a larger diameter than, the opening 204 in the base 200. The axis of the bearing, not shown, within the bearing housing 216 intersects the axis of the coaxial openings 204 and 217, respectively, in the base 200 and in the base 214. The axis of the bearing, not shown, within the bearing mounting 208 also intersects the axis of the openings 204 and 217, respectively, in the base 200 and in the base 214. The numeral 220 denotes an arcuate slot in the movable base 214, and that slot is adjacent the arcuate edge of that base. The radii and the axes of generation of that slot and of the upper portion of the slot 206 in the base 200 are identical.

A pivot 222, which is shown as a shouldered bolt, is disposed within the openings 217 and 204, respectively, in the bases 214 and 200; and that bolt has a washer and a nut at the lower end thereof. That pivot maintains the base 214 in assembled relation with the base 200 while permitting rotation of the former relative to the latter. A clamp 224 consists of a bolt, a washer, and a nut. The head of that bolt is disposed within, but can slide along the length of the lower portion 207 of the arcuate slot 206; and the shank of that bolt extends upwardly through the upper portion of that arcuate slot and through the slot 220 in the base 214. That shank can slide along the lengths of those arcuate slots. The washer overlies the edge of the slot 220; and the nut can clamp that washer against the edges of that slot with sufficient force to prevent relative movement between the base 214 and the base 200.

Shaft 226 is journaled within a bearing, not shown, within the bearing mounting 216. Collars 227 are telescoped over that shaft; and those collars are held immediately adjacent the ends of the bearing within that bearing mounting by set screws, not shown. Those collars prevent axial shifting of the shaft 226 while permitting unimpeded rotation of that shaft.

By loosening the nut of the clamp 224, and by causing the head of the bolt of that clamp to slide within the lower portion 207 of the arcuate slot 206, it is possible to rotate the base 214 about the pivot 222 from the position shown by FIG. 9 to a position which is displaced in the clockwise direction from that position by as much as 90°. Further, it is possible to rotate the base 214 as much as 30° in the counterclockwise direction, thereby providing up to 120° of deflection. Also, it is possible to move the base 214 to provide any desired angle of deflection from 0° to 120° between the axes of shafts 212 and 226.

The numeral 228 denotes an end member which is telescoped over the right-hand end of the shaft 226 in FIG. 9; and a rivet 229 permanently secures that end member to that shaft. The end member 228 preferably will be identical to the end member 12 in FIG. 1, except for the absence of the projections 20 and 22. The numeral 230 denotes a support which preferably is identical to the support 30 in FIGS. 1–6; and pivots 232 rotatably secure that support to the end element 228. Preferably, as in the case of the pivots 44 and 46 in FIGS. 1–6, the pivots 232 are shouldered screws. The numerals 234 and 242 denote cylinder-like, torque-transmitting members which preferably are identical to the cylinder-like torque-transmitting members 94 and 102 of FIGS. 1–6. Pivots 238 and 246, respectively, will rotatably secure those cylinder-like torque-transmitting members to the support 230. The numerals 236 and 244 denote piston-like torque-transmitting members which are telescoped within the cylinder-like, torque-transmitting members 234 and 242, respectively. Those piston-like torque-transmitting members preferably are identical to the piston-like torque-transmitting members 98 and 106 in FIGS. 1–6. Pivots 240 and 248 rotatably secure those piston-like torque-transmitting members to a support 250, that preferably is identical to the support 62. An end member 254 is telescoped over the upper end of the shaft 212 in FIG. 9; and a rivet 256 permently secures that end member to that shaft. That end member differs from the end member 50 of FIGS. 1–6 by having the projections 52 and 54 deleted therefrom. Pivots 252 rotatably secure the support 250 to the end member 256.

The functions and operations of the end members 228 and 254, of the supports 230 and 250, of the pivots 232 and 252, of the cylinder-like torque-transmitting members 234 and 242, and of the piston-like, torque-transmitting members 236 and 244 preferably are identical to the functions and operations of the end members 12 and 50, of the supports 30 and 62, of the pivots 44 and 46 and of the pivots 76 and 78, of the cylinder-like, torque-transmitting members 94 and 102, and of the piston-like, torque-transmitting members 98 and 106. The basic difference between the structure of FIGS. 9 and 10 and the structure of FIGS. 1–6 is that the base 200 and its bearing block 208 coact with the base 214 and its bearing block 216 to fixedly hold the axes of the shafts 212 and 226 so they intersect, and so the intersection of those axes also is equidistant from the pivots 232 and 252—regardless of the angle of deflection between those shafts. This means that the structure of FIGS. 9 and 10 has a virtual, rather than an actual, axis-interrelating and centering means. Another difference between the structure of FIGS. 9 and 10 and the structure of FIGS. 1–6 is that the former structure can provide a deflection angle ranging from 0° to as much as 120°. The structure of FIGS. 1–6 can provide angles of deflection from 0° to 100°. If the structure of FIGS. 1–6 were to be equipped with a virtual, rather than an actual, axis-interrelating and centering means, and if appropriate changes were made in the dimensions of the supports 30 and 62 and of the variable-length torque-transmitting links, that structure also could provide deflection angles ranging up to 120°.

The structure of FIGS. 9 and 10 can be used to supplant gear-type drives between angularly-displaced shafts. In doing so, that structure can avoid the backlash which is inherent in the use of gears, and also can avoid the noise, frictional loss, and wear which develop as the teeth of one gear move into engagement with the teeth of the mating gear.

As in the case of the structure shown in FIGS. 1–6, bearings, not shown, will be provided for the pivots 232 and 252 for the supports 230 and 250, for the pivots 238 and 246 for the cylinder-like, torque-transmitting members 234 and 242, and for the pivots 240 and 248 for the piston-like, torque-transmitting members 236 and 244. Further, where space permits, those bearings will be anti-friction bearings. As a result, the frictional losses in the structure of FIGS. 9 and 10 will be small.

DETAILED DESCRIPTION OF PREFERRED EMBODIMENT OF FIGS. 11 AND 12

Referring particularly to FIGS. 11 and 12, the numeral 258 denotes a shaft which has the right-hand end thereof extending into a cylindrical socket 262 within an end member 260. The numeral 264 denotes a cylindrical recess within that end member which has a diameter smaller than that of the recess 262, but which is concentric with and communicates with that recess. A sleeve bearing 269 is pressed within, and is held by, the recess 264. The numeral 266 denotes a radially-directed threaded socket in the end member 260 which extends through the wall of the sleeve bearing to communicate with the recess 264. The numeral 268 denotes a threaded socket in the end member 260 which is disposed to the right of, and which has a smaller diameter than, the threaded socket 266; and that socket stops short of the wall of the sleeve bearing 269. The numeral 270 denotes a rivet which permanently secures the end member 262 to the shaft 268.

The numeral 282 denotes a shaft which can be set so it is coaxial with, or is deflected from, the axis of the shaft 258. An end member 284 is telescoped over one end of that shaft and is permanently secured to that shaft by a rivet 286.

The numeral 274 denotes a pivot block which is rectangular in plan, as shown by FIG. 12, and which is square in cross section, as shown by FIG. 11. That pivot block has a passage through the center thereof. A similar pivot block is denoted by the numeral 272; and those pivot blocks are disposed at the opposite ends of a diameter of the right-hand end of the end member 260. Pivot block 288 and 290, which preferably are identical to the pivot blocks 272 and 274, are disposed at opposite ends of a diameter at the outer end of the end member 284. The numeral 300 denotes a pivot, which has the form of a shouldered screw; and the threaded shank of that pivot extends through the passage in the pivot block 272 and seats in the threaded socket 268 in the end element 260. That pivot rotatably secures the pivot block 272 to that end element. A similar pivot 302 rotatably secures the pivot block 274 to that end element; and the axis of that pivot and the axis of pivot 300 are coaxial. The numerals 304 and 306 denote pivots which preferably are shouldered screws and which hold the pivot blocks 290 and 288 in assembled relation with the end member 284, but which permit rotation of those pivot blocks relative to that end member. The axes of the pivots 304 and 306 are coaxial.

The numeral 278 denotes a yoke which has an elongated shank with an annular groove 280 therein. That shank is disposed within, and can rotate relative to, the sleeve bearing 269 within the recess 264 in the end member 260. The annular groove 280 is in register with, and accommodates, the projecting end of a set screw 276 which is disposed within the threaded socket 266 in the end member 260; and that projecting end can limit axial movement, but permit rotation, of the yoke 278 relative to that end member. That yoke can be essentially identical to one of the yokes of a standard Hookes-type universal joint. A yoke 292 is formed on, and is integral with, the outer end of the end member 284; and that yoke can be essentially identical to the other yoke of a Hookes-type universal joint. A connector 294 is disposed within the open ends of the yokes 278 and 292; and that connector is rotatably secured to those yokes by pivots 296 and 298.

The yokes 278 and 292, the connector 294, the pivots 296 and 298, the sleeve bearing 269 and the set screw 276 constitute an axes-interrelating and centering means. The axes-interrelating and centering means of FIGS. 1–6 and of FIGS. 7 and 8 permit greater angular deflections of the shafts, with which the universal joints of which they are parts are used, than does the axes-interrelating and centering means of FIGS. 11 and 12. However, the torque-transmitting links of FIGS. 1–10 and 13 permit no greater angular deflections of the shafts, with which the universal joints of which they are parts are used, than can the torque-transmitting links of FIGS. 11 and 12. As a result, the axes-interrelating and centering means of FIGS. 11 and 12 could be incorporated into universal joints which are to be used with shafts that are to be limited to deflection angles of less than 70°.

The numeral 308 denotes a torque-transmitting member with bifurcated ends; and the left-hand bifurcated end of that member encloses the end faces of the pivot block 272. The numeral 310 denotes an identical torque-transmitting member; and the upper bifurcated end of that member encloses the end faces of the pivot block 274 as shown by FIG. 12. Pivots 316 rotatably secure the member 308 to the pivot block 272; and pivots 322 rotatably secure the member 310 to the pivot block 274. The numeral 312 denotes a torque-transmitting member with just one bifurcated end; and that bifurcated end encloses the end faces of the pivot block 290. Pivots 320 rotatably secure that member to that pivot block. The other end of the member 312 is rotatably secured to the other bifurcated end of the member 308 by a pivot 318. The numeral 314 denotes a member with just one bifurcated end; and that bifurcated end encloses the end faces of the pivot block 288. Pivots 326 rotatably secure that member to that pivot block. The other end of the member 314 is pivotally secured to the other end of the member 310 by a pivot 324.

Bearings will surround the pivots 296, 298, 300, 302, 304, 306, 316, 318, 320, 322, 324 and 326. Where space permits, those bearings preferably will be anti-friction bearings.

The end members 260 and 284 of FIGS. 11 and 12 will function and operate in essentially the same manner in which the end members 12 and 50 of FIGS. 1-6 function and operate. The members 308 and 312 constitute a torque-transmitting link which will accommodate any variations in the linear spacing between the pivots 316 and 320 that develop as the axis of the shaft 282 is deflected relative to the axis of the shaft 258. The members 310 and 314 also constitute a torque-transmitting link which will accommodate any variations in the linear spacing between the pivots 322 and 326 that develop as the axis of the shaft 282 is deflected relative to the axis of the shaft 258. Whenever the axes of those shafts are coaxial, the link 308, 312 and the link 310, 314 subtend equal angles; and pivots 318 and 324 are equidistant from the axes of those shafts. When the axes of those shafts are coaxial, the spacing between the pivots 318 and 324 will remain constant; and hence there will be no "knee action" in link 308, 312 or in link 310, 314. However, whenever the axis of the shaft 282 is displaced from the axis of the shaft 258, one of those links will subtend a larger angle, and the other of those links will subtend a smaller angle than in the zero deflection position. Thus, in the position shown by FIG. 11, the link 310, 314 subtends the smaller angle and the link 308, 312 subtends the larger angle. It should be noted that link 308, 312 and link 310, 314 always lie in a common plane defined by pivots 300, 302 and 304, 306.

If it is assumed that the shaft 258 is the driving shaft, rotation of that shaft in the direction indicated by the arrow in FIG. 11 will cause the link 310, 314 to start moving from the position shown by FIG. 11 toward the position shown by FIG. 12, and will cause the link 308, 312 to start moving from the position shown by FIG. 11 toward a position which is below, but which is in a register with, the position that link 310, 314 occupies in FIG. 12. The angle which is subtended by the link 310, 314 will increase during that first quadrant of rotation, but the angle which is subtended by the link 308, 312 will decrease during that first quadrant of rotation. During the second quadrant of rotation of the shaft 258, the angle which is subtended by the link 310, 314 will continue to increase until it reaches the size of the angle which is subtended by the link 308, 312 in FIG. 11. During that second quadrant of rotation, the angle which is subtended by the link 308, 312 will continue to decrease until it reaches the size of the angle which is subtended by the link 310, 314 in FIG. 11.

During the third and fourth quadrants of rotation of the shaft 258, the angle which is subtended by the link 310, 314 will decrease until it again has the size shown in FIG. 11. Similarly, during those third and fourth quadrants of rotation, the angle which is subtended by the link 308, 312 will increase until it again has the size shown in FIG. 11. At the end of the fourth quadrant of rotation of the shaft 258, the links 308, 312 and 310, 314 will again be in the positions shown in FIG. 11.

During the four quadrants of rotation of the shaft 258, the yokes 278 and 292 will coact with the connector 294 and the pivots 296 and 298 to hold the axes of the shafts 258 and 282 so they intersect. Also, those yokes will coact with that connector and with those pivots to hold the axis of that connector equidistant from the axes which are defined by the pivots 300 and 302 and by the pivots 304 and 306. During those quadrants of rotation, the yoke 278 can oscillate in rotation relative to the sleeve bearing 269, but the projection on the end of the set screw 276 will prevent axial movement of that yoke.

The pivot blocks 272 and 274 effectively constitute a support which extends transversely of the end member 260 and which can oscillate relative to that end member about an oscillation axis that is defined by the pivots 300 and 302. Similarly, the pivot blocks 288 and 290 effectively constitute a support which extends transversely of the end member 284 and which can oscillate relative to that end member about an oscillation axis that is defined by the pivots 304 and 306. The links 308, 312 and 310, 314 effectively constitute variable-length torque-transmitting links which extend between, and which are pivoted to, the support that is defined by the pivot blocks 272 and 274 and the support that is defined by the pivot blocks 288 and 290.

The support that is defined by the pivot blocks 272 and 274 differs from the support 30 of FIGS. 1-6 in that those pivot blocks do not coact to define an open frame. Similarly, the support that is defined by the pivot blocks 288 and 290 differs from the support 62 of FIGS. 1-6 in that those pivot blocks do not coact to define an open frame. However, the support that is defined by the pivot blocks 272 and 274 is similar to the support 30 in that it is directed transversely of the end element to which it is pivotally secured, it oscillates about an axis which lies on a diameter of that end element, and it holds pivots about which effectively variable-length torque-transmitting links oscillate during the rotation of the driving shaft. Similarly, the support that is defined by the pivot blocks 288 and 290 is similar to the support 62 in that it is directed transversely of the end element to which it is pivotally secured, it oscillates about an axis which lies on a diameter of that end element, and it hold pivots about which effectively variable-length torque-transmitting links oscillate during the rotation of the driving shaft.

DETAILED DESCRIPTION OF PREFERRED EMBODIMENT OF FIG. 13

FIG. 13 shows the shaft 212 of FIGS. 9 and 10 disposed so it is parallel to, but displaced radially from, the shaft 226. The support 230 will respond to rotation of the shaft 226 to rotate circumferentially with that shaft and also to oscillate about the oscillation axis which is defined by the pivots 232. The torque-transmitting links 234, 236 and 242, 244 will respond to the movement of the support 230 to cause the support 250 to rotate circumferentially and also to oscillate about the oscillation axis which is defined by the pivots 252. The shaft 212 will respond to the movement of the support 250 to rotate in the same direction and at the same speed as the shaft 226. As a result, the structure shown in FIG. 13 can be used as a driving coupling for shafts which are parallel to, but which are displaced radially from, each other. Although the shafts 212 and 226 are shown as being exactly parallel to each other, the torque-transmitting system of FIG. 13 could effectively transmit torque from the shaft 226 to the shaft 212, or vice versa, even if the axes of those shafts were displaced from each other by a small acute angle.

Conclusion

Each universal joint in my U.S. Pat. No. 3,924,420 has three oscillation axes, and each of them utilizes an angle-dividing means to hold one of those axes so it always bisects the supplement of the angle of deflection. Moreover, many prior universal joints have three oscillation axes and utilize angle-dividing means to hold one of those axes so it always bisects the supplement of the angle of deflection. Importantly, none of the universal joints provided by the present invention requires such angle-dividing means; and hence those universal joints can be more compact, stronger, and less expensive than prior universal joints which require such angle-dividing means.

If desired, two universal joints provided by the present invention could be connected to an elongated variable length splined shift to supplant a flexible shaft. As indicated by FIGS. 9 and 10, one of the universal joints provided by the present invention could be used to supplant angle-type gearing. Further, as indicated by FIG. 13, one of the universal joints provided by the present invention could be used to supplant gear-type drives for radially-displaced shafts. The foregoing illustrations merely suggest, and do not limit, areas of utility for the universal joints provided by the present invention. Where any of the universal joints of the present invention is made so it has a virtual, rather than an actual, axes-interrelating and centering means, and where that universal joint is used as a coupling drive for radially-displaced shafts, that universal joint is more properly referred to as a torque-transmitting system than as a universal joint.

The use of an actual axes-interrelating and centering means effectively limits the maximum permissible angle of deflection to about 100°. Thus, even where a universal joint is equipped with the axes-interrelating and centering means of FIGS. 1–6 or of FIGS. 7 and 8, the maximum permissible angle of deflection is about 100°. Where the axes-interrelating and centering means of FIGS. 11 and 12 is used, the maximum permissible angle of deflection is about 70°. On the other hand where, as in FIGS. 9 and 10, a virtual rather than an actual axes-interrelating and centering means is used, the maximum permissible angle of deflection can be as large as 120°. If virtual, rather than actual, axes-interrelating and centering means were to be used on the universal joints of FIGS. 1–6, 7 and 8 and 11 and 12, those universal joints also could provide angles of deflection as large as 120°.

The torque-transmitting links which are used in the various universal joints provided by the present invention must effectively have variable lengths if those universal joints are to be capable of accommodating different angles of deflection. Preferably, universal joints which utilize variable length torque-transmitting links should be limited to areas of use wherein the deflection angles do not exceed 110°. For those universal joints which are intended to accommodate deflection angles between 110° and 120°, it is preferably to make those universal joints so they can accommodate just one predetermined angle of deflection and so they have fixed-length torque-transmitting links.

To enable any universal joint provided by the present invention to provide constant speed, and to be free of acceleration and deceleration forces during each revolution of the driven shaft, the actual axes-interrelating and centering means must have the axes thereof at the intersection of the shafts, to which that universal joint is connected, in all deflected positions of those shafts. Further, the axis of that axes-interrelating and centering means must be spaced equal distances from the oscillation axes about which the supports oscillate.

It would be possible, if it ever became desirable to do so, to displace the axis of an axes-interrelating and centering means further from the oscillation axis for one support of the universal joint than it is from the oscillation axis of the other support of that universal joint. In fact, it would be possible to make the distance between the axis of the axes-interrelating and centering means to the oscillation axis for one of those supports as small as 75 percent of the length of the distance from that axis to the oscillation axis for the other of those supports. Where that was done, a speed variation of plus or minus 18 percent would be noted when the angle of deflection between the axes of the shafts was 90°. Where the angle of deflection between the axes of the shafts was less than 90°, the speed variation would, of course, be smaller. Even where the angle of deflection between the axes of the shafts was 90°, the variation in speed would be comparable to the variation in speed which is noted when the angle between two shafts, that are interconnected by a Hookes-type universal joint, is only 30°.

The use of transversely-directed, torque-transmitting supports which have the configurations of open frames is desirable, because such frames can be made light in weight and can be pivotally secured at each side thereof to the end members. However, if desired, the supports 30 and 62 of FIGS. 1–6 could be made so they were C-shaped in configuration; and, in that event, either the pivot 44 or the pivot 46 could be eliminated, and either the pivot 76 or the pivot 78 could be eliminated. In such event, the remaining pivot would be strengthened, and the retained side wall of each support also would be strengthened. Similarly, the supports 120 and 134 of FIGS. 7 and 8 and the supports 230 and 250 of FIGS. 9, 10 and 13 could be made so they were C-shaped in configuration.

The supports 30 and 62 of FIGS. 1–6 have variable-length, torque-transmitting links at each end thereof. Such an arrangement is desirable, because it permits the side walls, end walls and auxiliary walls of those supports as well as the cylinder-like, torque-transmitting members and the piston-like, torque-transmitting members to be made relatively light in weight. However, if desired, the lower portions of the side walls, one end wall, and one auxiliary wall of each of the supports 30 and 62 could be eliminated; and the variable-length, torque-transmitting link which is pivotally connected to those end walls also could be eliminated. In such event, the remaining portions of the side walls, the retained end wall and the retained auxiliary wall of each of those supports would be made stronger; and the retained cylinder-like, torque-transmitting member and the retained piston-like, torque-transmitting member also would be made stronger. Similarly, the lower portions of the side walls, one end wall, and one auxiliary wall of each of the supports 120 and 134 in FIGS. 7 and 8 and the lower portions of the side walls, one end wall, and one auxiliary wall of each of the supports 230 and 250 in FIGS. 9, 10 and 13 could be eliminated; and the variable-length, torque-transmitting links which are pivotally connected to those end walls also could be eliminated.

The adjustable-length, torque-transmitting links, which are constituted by the torque-transmitting members 94, 98, 102 and 106 of FIGS. 1–6, transmit torque from the support 30 to the support 62, and vice versa, regardless of the angle of deflection between the shafts 10 and 48. As a result, those adjustable-length, torque-transmitting links make it possible for the axis of the shaft 48 to be set as any one of an infinite number of desired deflection angles relative to the axis of shaft 10. Similarly, the adjustable-length, torque-transmitting links, which are constituted by the torque-transmitting members 142, 146, 151 and 152 of FIGS. 7 and 8, the adjustable-length, torque-transmitting links, which are constituted by the torque-transmitting members 234, 236, 242 and 244 of FIGS. 9, 10 and 13, and the adjustable-length, torque-transmitting links, which are constituted by the torque-transmitting members 308, 310, 312 and 314 of FIGS. 11 and 12 transmit torque regardless of the angles of deflection between the shafts in FIGS. 7–13. As a result, those adjustable-length, torque-transmitting links make it possible for the axis of the driving shaft to be set at any one of an infinite number of desired deflection angles relative to the axis of the driven shaft. However, whenever the axes of the driving and driven shafts are positively fixed, by elongated bearings for those shafts or by axially-spaced bearings for each of those shafts, fixed-length, torque-transmitting links can be substituted for the variable-length, torque-transmitting links shown in FIGS. 1–10 and 13.

The axes-interrelating and centering means of FIGS. 1–8, 11 and 12 are actual axes-interrelating and centering means; and they make it possible to use the universal joints of FIGS. 1–8, 11 and 12 to interconnect shafts whose axes are not positively confined as to radial or angular position. The elongated bearings within the bearing blocks 208 and 216 coact with the bases 200 and 214 of FIGS. 9 and 10 to positively fix the radial and angular position of the axis of shaft 212 relative to the axis of shaft 226; and hence virtual or external, rather than actual, axes-interrelating and centering means are used in the universal joint of FIGS. 9 and 10.

Where anti-friction bearings of the sealed type are used in any of the universal joints or torque-transmitting systems provided by the present invention, that universal joint or torque-transmitting system can be operated without a boot or other enclosure. This is desirable, because boots wear out and thereby permit the lubricant held therein to escape. Where any of the universal joints or torque-transmitting systems provided by the present invention is equipped with anti-friction bearings of the sealed type, that universal joint or torque-transmitting system can be used successfully in even very "dirty" atmospheres and locations without a boot or other enclosure therefor.

Each of the actual axes-interrelating and centering means, which the present invention provides for a variable deflection angle universal joint, must have a fixed connection to at least one end element of that universal joint. Also, each of those actual axes-interrelating and centering means must permit relative oscillation between at least two of the elements thereof. Further, each of those actual axes-interrelating and centering means must be capable of resisting side loads and end loads without transmitting torque from one end element to the other.

The torque-transmitting links of the universal joints provided by the present invention must effectively have variable lengths where they are used with variable deflection angle universal joints. However, those torque-transmitting links will not, when used in the universal joints of FIGS. 1–10, change their effective lengths during circumferential rotation of the driving and driven shafts. Moreover, those torque-transmitting links will have fixed lengths where they are used with fixed deflection angle universal joints or with fixed displacement torque-transmitting systems. The pivots, which connect any given torque-transmitting link to the supports of a universal joint provided by the present invention, must be in a common plane in all positions of that universal joint. Further, where the universal joint is intended to provide constant speed and to be free of acceleration and deceleration forces during each revolution of the driven shaft, the midpoint of each such torque-transmitting link must coact with the point of intersection of the axes of the driving and driven shaft to define a line that lies in the plane which bisects the supplement of the angle of deflection.

Each of the universal joints or torque-transmitting systems of the present invention has a first oscillation axis about which the first torque-transmitting support can oscillate relative to the first end member, has a second oscillation axis about which the second torque-transmitting support can oscillate relative to the second end member, has a third oscillation axis about which the first torque-transmitting link can oscillate relative to the first torque-transmitting support, and has a fourth oscillation axis about which the second torque-transmitting link can oscillate relative to the second torque-transmitting support. The provision of those four oscillation axes enables the third and fourth oscillation axes to always parallel a line which bisects the supplement of the deflection angle, and thereby obviates the need for the angle-dividing means which most constant speed universal joints require.

Whereas the drawing and accompanying description have shown and described several preferred embodiments of the present invention, it should be apparent to those skilled in the art that various changes may be made in the form of the invention without affecting the scope thereof.

What I claim is:

1. A torque-transmitting system which comprises a first end member, a first torque-transmitting support which is pivotally secured to said first end member, said first support being directed transversely of the axis of said first end member, a second end member which can have the axis thereof displaced from the axis of said first end member, a second torque-transmitting support which is pivotally secured to said second end member, said second support being directed transversely of the axis of said second end member, and a torque-transmitting link pivotally secured to both said first and said second supports, said first support rotating circumferentially with and also oscillating relative to said first end member during rotation of said first end member, said torque-transmitting link responding to said circumferential rotation and to said oscillation of said first support to cause said second support to rotate circumferentially and to oscillate, said second support causing said second end member to rotate as said second support rotates circumferentially and oscillates, said torque-transmitting link moving through 360° during each revolution of said first end member, said torque-transmitting link including at least two elements that are relatively reciprocable to permit said torque-transmitting link to have different overall lengths but said torque-transmitting link being dimensioned so it occupies only a small portion of said 360° at any instant, said torque-transmitting link having an axis, and said torque-transmitting link having rigidifying means at one end thereof directed transversely of said axis of said torque-transmitting link to rigidify said torque-transmitting link and thereby substantially prevent torsional deformation of said torque-transmitting link.

2. A torque-transmitting system which comprises a first end member, a first torque-transmitting support which is pivotally secured to said first end member, said first support being directed transversely of the axis of said first end member, a second end member which can have the axis thereof displaced from the axis of said first end member, a second torque-transmitting support which is pivotally secured to said second end member, said second support being directed transversely of the axis of said second end member, a torque-transmitting link pivotally secured to both said first and said second supports, said first support rotating circumferentially with and also oscillating relative to said first end member during rotation of said first end member, said torque-transmitting link responding to said circumferential rotation and to said oscillation of said first support to cause said second support to rotate circumferentially and to oscillate, said second support causing said second end member to rotate as said second support rotates circumferentially and oscillates, and axes-interrelating means on said first and second end members which always hold the axes of said first and second end members in intersecting relation, at least part of said axes-interrelating means on said first end member being fixed against rotation relative to said first end member, at least part of said axes-interrelating means on said second member being fixed against rotation relative to said second end member, said axes-interrelating means permitting the axis of said second end member to be set at different angles relative to the axis of said first end member.

3. A torque-transmitting system which comprises a first end member, a first torque-transmitting support which is pivotally secured to said first end member, said first support being directed transversely of the axis of said first end member, a second end member which can have the axis thereof displaced from the axis of said first end member, a second torque-transmitting support which is pivotally secured to said second end member, said second support being directed transversely of the axis of said second end member, a torque-transmitting link pivotally secured to both said first and said second supports, said first support rotating circumferentially with and also oscillating relative to said first end member during rotation of said first end member, said torque-transmitting link responding to said circumferential rotation and to said oscillation of said first support to cause said second support to rotate circumferentially and to oscillate, said second support causing said second end member to rotate as said second support rotates circumferentially and oscillates, said torque-transmitting link moving through 360° during each revolution of said first end member, said torque-transmitting link having a plurality of relatively-movable elements, said relatively-movable elements being movable relative to each other to permit the axis of said second end member to be set at different positions relative to the axis of said first end member, said relatively-movable elements of said torque-transmitting link having interacting surfaces thereon which prevent rotation of said relatively-movable elements relative to each other, said torque-transmitting link being dimensioned so it occupies only a small portion of said 360° at any instant, at least one of said relatively-movable elements of said torque-transmitting link having a substantially-closed end.

4. A torque-transmitting system which comprises a first end member, a first torque-transmitting support which is pivotally secured to said first end member, said first support being directed transversely of the axis of said first end member, a second end member which can have the axis thereof displaced from the axis of said first end member, a second torque-transmitting support which is pivotally secured to said second end member, said second support being directed transversely of the axis of said second end member, a torque-transmitting link pivotally secured to both said first and said second supports, said first support rotating circumferentially with and also oscillating relative to said first end member during rotation of said first end member, said torque-transmitting link responding to said circumferential rotation and to said oscillation of said first support to cause said second support to rotate circumferentially and to oscillate, said second support causing said second end member to rotate as said second support rotates circumferentially and oscillates, and axes-interrelating means on said first and second end members that provide a rotary degree of freedom at the center point of the torque-transmitting system and that always hold the axes of said first and second end members in intersecting relation, at least part of said axes-interrelating means on said first end member being fixed against rotation relative to said first end member, at least part of said axes-interrelating means on said second member being fixed against rotation relative to said second end member, said axes-interrelating means having a plurality of elements, said plurality of elements permitting universal movement between said end elements.

5. A torque-transmitting system as claimed in claim 1 wherein supporting members, for the shafts to which said end members are secured, provide a virtual axes-interrelating means.

6. A torque-transmitting system as claimed in claim 1 wherein supporting members, for the shafts to which said end members are secured, provide a virtual axes-interrelating means, and wherein said supporting members are relatively movable to permit the axis of said second end member to be displaced relative to the axis of said first end member.

7. A torque-transmitting system which comprises a first end member, a first torque-transmitting support which is pivotally secured to said first end member, said first support being directed transversely of the axis of said first end member, a second end member which can have the axis thereof displaced from the axis of said first end member, a second torque-transmitting support which is pivotally secured to said second end member, said second support being directed transversely of the axis of said second end member, a torque-transmitting link pivotally secured to both said first and said second supports, said first support rotating circumferentially with and also oscillating relative to said first end member during rotation of said first end member, said torque-transmitting link responding to said circumferential rotation and to said oscillation of said first support to cause said second support to rotate circumferentially and to oscillate, said second support causing said second end member to rotate as said second support rotates circumferentially and oscillates, and axes-interrelating means on said first and second end members that always hold the axes of said first and second end members in intersecting relation, said axes-interrelating means holding the intersection of said axes equidistant from the pivots for said first and second supports, at least part of said axes-interrelating means on said first end member being fixed against rotation relative to said first end member, at least part of said axes-interrelating means on said second member being fixed against rotation relative to said second end member, said axes-interrelating means permitting the axis of said second end member to be set at different angles relative to the axis of said first end member, said torque-transmitting link having an axis, and said torque-transmitting link having rigidifying means at one end thereof directed transversely of said axis of said torque-transmitting link to rigidify said torque-transmitting link and thereby substantially prevent torsional deformation of said torque-transmitting link.

8. A torque-transmitting system which comprises a first end member, a first torque-transmitting support which is pivotally secured to said first end member, said first support being directed transversely of the axis of said first end member, a second end member which can have the axis thereof displaced from the axis of said first end member, a second torque-transmitting support which is pivotally secured to said second end member, said second support being directed transversely of the axis of said second end member, a torque-transmitting link pivotally secured to both said first and said second supports, said first support rotating circumferentially with and also oscillating relative to said first end member during rotation of said first end member, said torque-transmitting link responding to said circumferential rotation and to said oscillation of said first support to cause said second support to rotate circumferentially and to oscillate, said second support causing said second end member to rotate as said second support rotates circumferentially and oscillates, said torque-transmitting link moving through 360° during each revolution of said first end member, said torque-transmitting link including at least two elements that are relatively reciprocable to permit said torque-transmitting link to have different overall lengths but said torque-transmitting link being dimensioned so it occupies only a small portion of said 360° at any instant, said torque-transmitting link having an axis, and said torque-transmitting link having rigidifying means at one end thereof directed transversely of said axis of said torque-transmitting link to rigidify said torque-transmitting link and thereby substantially prevent torsional deformation of said torque-transmitting link, axes-interrelating means on said first and second end members that always hold the axes of said first and second end members in intersecting relation, at least part of said axes-interrelating means on said first end member being fixed against rotation relative to said first end member, at least part of said axes-interrelating means on said second member being fixed against rotation relative to said second end member, and said axes-interrelating means permitting the axis of said second end member to be set at angles in excess of 35° relative to the axis of said first end member.

9. A torque-transmitting system as claimed in claim 1 wherein the axis of said second end element is displaced radially of said first end element, wherein said first torque-transmitting support pivots relative to said first end member about a first oscillation axis, wherein said second torque-transmitting support pivots relative to said second end member about a second oscillation axis, and wherein a straight line between said first and second oscillation axes always is inclined to the axis of said first end member.

10. A torque-transmitting system as claimed in claim 1 wherein said torque-transmitting link includes relatively movable members and a pivot for said relatively movable members.

11. A torque-transmitting system as claimed in claim 1 wherein said torque-transmitting link includes relatively movable members and a pivot for said relatively movable members, and wherein said pivot moves toward and away from said axes of said end members during each revolution of said end members when the axis of said second end member is displaced angularly from said axis of said first end member.

12. A torque-transmitting system which comprises a first end member, a first torque-transmitting support which is pivotally secured to said first end member, said first support being directed transversely of the axis of said first end member, a second end member which can have the axis thereof displaced from the axis of said first end member, a second torque-transmitting support which is pivotally secured to said second end member, said second support being directed transversely of the axis of said second end member and a torque-transmitting link pivotally secured to both said first and said second supports, said first support rotating circumferentially with and also oscillating relative to said first end member during rotation of said first end member, said torque-transmitting link responding to said circumferential rotation and to said oscillation of said first support to cause said second support to rotate circumferentially and to oscillate, said second support causing said second end member to rotate as said second support rotates circumferentially and oscillates, said torque-transmitting link moving through 360° during each revolution of said first end member, said torque-transmitting link including at least two elements that are relatively reciprocable to permit said torque-transmitting link to have different overall lengths but said torque-transmitting link being dimensioned so it occupies only a small portion of said 360° at any instant, said torque-transmitting link having an axis, and said torque-transmitting link having rigidifying means at one end thereof directed transversely of said axis of said torque-transmitting link to rigidify said torque-transmitting link and thereby substantially prevent torsional deformation of said torque-transmitting link, said two elements of said torque-transmitting link having acircular interacting surfaces to prevent relative rotation between said two elements, and said rigidifying means being located inwardly of at least one of said acircular interacting surfaces, whereby said torque-transmitting link can transmit torque without torsional deformation thereof and without torsionally-induced displacement of said first and said second supports.

13. A torque-transmitting system which comprises a first end member, a first torque-transmitting support which is pivotally secured to said first end member, said first support being directed transversely of the axis of said first end member, a second end member which can have the axis thereof displaced from the axis of said first end member, a second torque-transmitting support which is pivotally secured to said second end member, said second support being directed transversely of the axis of said second end member, and a torque-transmitting link pivotally secured to both said first and said second supports, said first support rotating circumferentially with and also oscillating relative to said first end member during rotation of said first end member, said torque-transmitting link responding to said circumferential rotation and to said oscillation of said first support to cause said second support to rotate circumferentially and to oscillate, said second support causing said second end member to rotate as said second support rotates circumferentially and oscillates, said torque-transmitting link including at least two elements that are relatively reciprocable to permit said torque-transmitting link to have different overall lengths, said torque-transmitting link being adjacent one end of said first support and being wholly spaced away from the opposite end of said first support, and said torque-transmitting link being adjacent one end of said second support and being wholly spaced away from the opposite end of said second support.

14. A torque-transmitting system which comprises a first end member, a first torque-transmitting support which is pivotally secured to said first end member, said first support being directed transversely of the axis of said first end member, a second end member which can have the axis thereof displaced from the axis of said first end member, a second torque-transmitting support which is pivotally secured to said second end member, said second support being directed transversely of the axis of said second end member, and a torque-transmitting link pivotally secured to both said first and said second supports by a first pivot and a second pivot, said first support rotating circumferentially with and also oscillating relative to said first end member during rotation of said first end member, said torque-transmitting link responding to said circumferential rotation and to said oscillation of said first support to cause said second support to rotate circumferentially and to oscillate, said second support causing said second end member to rotate as said second support rotates circumferentially and oscillates, said torque-transmitting link including at least two elements that are relatively reciprocable to permit said torque-transmitting link to have different overall lengths, one surface of one of said elements of said torque-transmitting link confronting and being immediately adjacent one surface of said first support to minimize any bending of said first pivot, and one surface of another of said elements of said torque-transmitting link confronting and being immediately adjacent one surface of said second support to minimize any bending of said second pivot.

15. A torque-transmitting system which comprises a first end member, a first torque-transmitting support which is pivotally secured to said first end member, said first support being directed transversely of the axis of said first end member, a second end member which can have the axis thereof displaced from the axis of said first end member, a second torque-transmitting support which is pivotally secured to said second end member, said second support being directed transversely of the axis of said second end member, a torque-transmitting link pivotally secured to both said first and said second supports, said first support rotating circumferentially with and also oscillating relative to said first end member during rotation of said first end member, said torque-transmitting link responding to said circumferential rotation and to said oscillation of said first support to cause said second support to rotate circumferentially and to oscillate, said second support causing said second end member to rotate as said second support rotates circumferentially and oscillates, said torque-transmitting link including at least two elements that are relatively reciprocable to permit said torque-transmitting link to have different overall lengths, said torque-transmitting link being adjacent one end of said first support and being wholly spaced away from the opposite end of said first support, said torque-transmitting link being adjacent one end of said second support and being wholly spaced away from the opposite end of said second support, and means to prevent relative axial displacement of said first said end member and said second end member whenever said end members are rotating with a fixed angle between the axes thereof.

* * * * *